US012649494B2

(12) United States Patent
Schmidt

(10) Patent No.: US 12,649,494 B2
(45) Date of Patent: Jun. 9, 2026

(54) METHOD FOR TRAJECTORY PREDICTION AND METHOD FOR AUTOMATICALLY OPERATING A VEHICLE

(71) Applicant: MERCEDES-BENZ GROUP AG, Stuttgart (DE)

(72) Inventor: Julian Schmidt, Steißlingen (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 48 days.

(21) Appl. No.: 18/709,070

(22) PCT Filed: Oct. 10, 2022

(86) PCT No.: PCT/EP2022/078155
§ 371 (c)(1),
(2) Date: May 10, 2024

(87) PCT Pub. No.: WO2023/083539
PCT Pub. Date: May 19, 2023

(65) Prior Publication Data
US 2025/0026381 A1 Jan. 23, 2025

(30) Foreign Application Priority Data
Nov. 12, 2021 (DE) ..................... 10 2021 005 625.6

(51) Int. Cl.
*G06N 3/042* (2023.01)
*B60W 60/00* (2020.01)
(52) U.S. Cl.
CPC ....... *B60W 60/00276* (2020.02); *G06N 3/042* (2023.01)
(58) Field of Classification Search
CPC ....... B60W 60/00276; B60W 60/0027; B60W 40/04; B60W 2556/40; G06N 3/042;
(Continued)

(56) References Cited

U.S. PATENT DOCUMENTS

2021/0122380 A1* 4/2021 Lan ................... B60W 50/0097
2023/0085296 A1* 3/2023 Liu ........................ G06N 3/042
706/12

FOREIGN PATENT DOCUMENTS

CN 112465273 A * 3/2021 ............. G06N 3/044
EP 3783538 A1 * 2/2021 ........... G06F 18/241
JP 2018206036 A 12/2018

OTHER PUBLICATIONS

Office Action dated May 27, 2025 in related/corresponding JP Application No. 2024-525762.
(Continued)

*Primary Examiner* — Erin M Piateski
*Assistant Examiner* — Hajar Hassaniardekani
(74) *Attorney, Agent, or Firm* — PATENT PORTFOLIO BUILDERS PLLC

(57) ABSTRACT

A method for trajectory prediction of vehicles in the surroundings of an ego vehicle involves determining degrees of interaction between the vehicles using an attention-based interaction algorithm trained by machine. Individual vehicles from the multitude of the vehicles located in the surroundings of the ego vehicle are identified as relevant to the trajectory prediction by the interaction algorithm and selected for this when their respective degree of interaction with at least one of the vehicles whose trajectory is to be predicted exceeds a predetermined threshold value. In a subsequent learning step, a trajectory prediction algorithm is trained with the vehicles selected as relevant to the trajectory prediction, and the trajectory prediction carried out by the trajectory prediction algorithm is carried out for the vehicles selected as relevant to the trajectory prediction.

16 Claims, 3 Drawing Sheets

Figure 1:
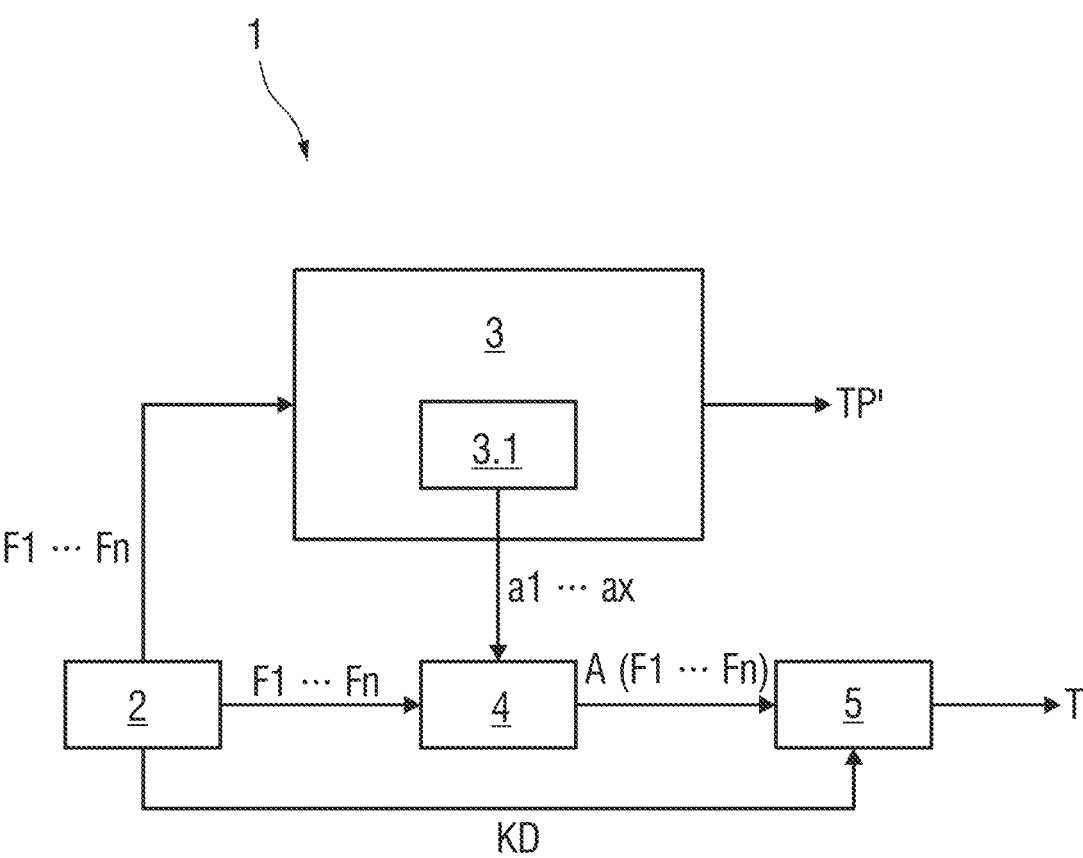

(58) Field of Classification Search
    CPC ........ G06N 3/0442; G06N 3/045; G06N 3/08;
                    G08G 1/09626; G08G 1/163; G08G
                    1/167; G08G 1/166; G08G 1/0125
    See application file for complete search history.

(56)                    References Cited

OTHER PUBLICATIONS

Carrasco et al.; "SCOUT: Socially-Consistent and Understandable Graph Attention Network for Trajectory Prediction of Vehicles and VRUs;" 2021 IEEE Intelligent Vehicles Symposium (IV); Jul. 11-17, 2021; Nagoya, JP.
International Search Report and Written Opinion mailed Feb. 17, 2023 in related/corresponding International Application No. PCT/EP2022/078155.
Khandelwal et al.; "What-If Motion Prediction for Autonomous Driving;" Aug. 24, 2020; arXiv:2008.10587v1; https://doi.org/10.48550/arXiv.2008.10587.
Liang et al.; "Learning Lane Graph Representations for Motion Forecasting;" Computer Vision—ECCV 2020; Nov. 2020; pp. 541-556.
Ma et al.; "TrafficPredict: Trajectory Prediction for Heterogeneous Traffic-Agents;" The Thirty-Third AAAI Conference on Artificial Intelligence (AAAI 2019); Jan. 2019; pp. 6120-6127.
Messaoud et al.; "Attention Based Vehicle Trajectory Prediction;" IEEE Transactions on Intelligent Vehicles; Mar. 2021, vol. 6, No. 1.
Office Action created Jul. 8, 2022 in related/corresponding DE Application No. 10 2021 005 625.6.
Salzmann et al.; "Trajectron++: Dynamically-Feasible Trajectory Forecasting with Heterogeneous Data;" Computer Vision—ECCV 2020; Dec. 4, 2020.
Tang et al.; "Multiple Futures Prediction;" 33rd Conference on Neural Information Processing Systems (NeurIPS 2019), Dec. 8-14, 2019; Vancouver, CA.
Vaswani et al.; "Attention is All You Need;" 31st Conference on Neural Information Processing Systems (NIPS 2017); Dec. 4-9, 2017; Long Beach, CA, USA.; https://arxiv.org/abs/1706.03762.
Office Action dated Feb. 2, 2026 in related/corresponding KR Application No. 10-2024-7012963, Examiner Note: I believe there is a typo, and the applicant refers to Office Action dated Jan. 2, 2026.

* cited by examiner

METHOD FOR TRAJECTORY PREDICTION AND METHOD FOR AUTOMATICALLY OPERATING A VEHICLE

BACKGROUND AND SUMMARY OF THE INVENTION

Exemplary embodiments of the invention relate to a method for trajectory prediction of vehicles in the surroundings of an ego vehicle, as well as to a method for automatically operating an ego vehicle.

Automatically, for example highly automatically or autonomously, driving vehicles are generally known from the prior art. In order to be able to meet safety requirements that are required of such vehicles, a prediction of a future movement by vehicles participating in traffic is necessary. This is referred to as trajectory prediction. Here, approaches that are based on machine-learning methods are known.

The term "scene" is used below for a surroundings situation detected by means of a surroundings detection of a vehicle, in which surroundings situation at least one further vehicle can be present. To describe such a scene, map data of a digital road map can also additionally be used.

Approaches for trajectory prediction, which, in contrast to rasterizing approaches such as a CNN-based approach (CNN: convolutional neural network), for example, do not carry out any rasterization of a scene, are based on so-called graph neural networks (GNNs for short) or a self-attention, also referred to below as attention-based approaches. In order to shape social interactions between vehicles, a graph is formed in these approaches. Nodes of the graphs are encodings of the vehicles in the scene. The nodes are connected to one another via edges.

Approaches exist that connect all vehicles in a scene to edges, such that complete graphs, also referred to as fully connected graphs, are formed. This means that all vehicles flow into the trajectory prediction of the vehicle to be predicted or are selected as relevant.

Other approaches form the edges of the graph depending on a distance between the individual vehicles. Thus, a distance-based preselection of the vehicles that are considered for the prediction of the vehicle to be predicted is made.

In "Y. Ma, et al.: TrafficPredict: Trajectory Prediction for Heterogeneous Traffic-Agents; In The Thirty-Third AAAI Conference on Artificial Intelligence, AAAI 2019, 2019, pages 6120 to 6127, doi: 10.1609/aaai.v33i01.33016120", a method for predicting future trajectories of traffic participants for navigating an automatically driving vehicle is described. Here, a real-time traffic prediction algorithm based on a so-called long short-term memory (LSTM for short) is used. This comprises an instance plane in order to learn movements and interactions of instances. Furthermore, the real-time traffic prediction algorithm comprises a category plane in order to learn similarities of instances of the same type and to thus refine the prediction.

Exemplary embodiments of the invention are directed to a novel method for trajectory prediction of vehicles in the surroundings of an ego vehicle and a novel method for automatically operating an ego vehicle.

In a method for trajectory prediction of vehicles in the surroundings of an ego vehicle, degrees of interaction between the vehicles are ascertained according to the invention by means of an attention-based interaction algorithm trained by machine. That is to say, the degrees of interaction are ascertained both for the interactions between the vehicles from the surroundings of the ego vehicle among one another and for the interactions between the ego vehicle and the vehicles from its surroundings. Furthermore, individual vehicles from the multitude of the vehicles found in the surroundings of the ego vehicle are identified as relevant to the trajectory prediction by means of the interaction algorithm and selected for this when their respective degree of interaction with at least one of the vehicles whose trajectory is to be predicted exceeds a predetermined threshold. In a subsequent learning step, a trajectory prediction algorithm trains with the vehicles selected as relevant for the trajectory prediction, in particular exclusively with the vehicles selected as relevant for the trajectory prediction, and the trajectory prediction conducted by means of the trajectory prediction algorithm is carried out for the vehicles selected as relevant for the trajectory prediction, in particular exclusively for the vehicles selected as relevant for the trajectory prediction.

In particular, the present method here forms a so-called two-step method for trajectory prediction of vehicles in which an interaction-based vehicle pre-selection is initially made and then a trajectory prediction with a reduced number of vehicles is carried out.

Learning-based trajectory prediction algorithms include map data of a high-resolution digital road map, for example, and are often based on a graph structure in which the further vehicles detected in the surroundings of the ego vehicle typically form nodes in a graph. Thus, a complexity of such trajectory prediction algorithms is scaled to the number of the vehicles in a scene. This generates a strong run-time dependency, in particular when map information also has to be retrieved for all vehicles in the scene. In addition, many irrelevant vehicles in the scene exacerbate a training process of the trajectory prediction algorithm and lead to inadequate prediction results and inadequate convergence behavior, for example. For example, far-off vehicles do not have a measurable effect on the trajectory prediction of the vehicle to be predicted. A selection of all agents or vehicles in a scene thus leads to the trajectory prediction algorithm having to independently recognize which surrounding vehicles have any informative added value for the prediction and which do not.

In contrast, by means of the present method, an initial preselection of relevant vehicles for the trajectory prediction algorithm is achieved by means of the interaction algorithm. To ascertain the interactions, map data of a high-resolution digital road map is advantageously not required, such that the interaction algorithm is characterized by a low level of complexity. Thus, in particular also for complex and, if applicable, map-based trajectory prediction algorithms, a complexity can be reduced by a limited selection of vehicles. In graph-based approaches, nodes in a graph can here be reduced, such that a run time is also reduced.

In comparison to a distance-based selection, the preselection of the relevant vehicles does not take place according to their distance, but according to their degree of interaction with the vehicle to be predicted. Thus, it can be taken into consideration, for example, that a future trajectory of a vehicle is greatly influenced by a vehicle driving ahead at a certain distance. In contrast, an influence by a vehicle driving behind in the same direction hardly takes place.

Thus, run-time improvements of the final trajectory prediction algorithm can be achieved by means of the present method in comparison to approaches without preselection. A training time of the final trajectory prediction algorithm can also be reduced by preselecting the relevant vehicles. Furthermore, a quality improvement of the final trajectory prediction can be implemented in comparison to approaches without preselection and in comparison to approaches with distance-based preselection. An indicator for interactions between the vehicles can also additionally be used for other tasks, for example for targeted influence of other traffic participants.

Due to the preselection and thus the reduction of a number of the vehicles, trajectory prediction algorithms with high complexity with low processing effort and low run-time can also be used. For example, the trajectory prediction algorithm used here is formed according to:

C. Tang and R. R. Salakhutdinov: "Multiple Futures Prediction"; In: Advances in Neural Information Processing Systems, 2019, vol. 32, T. Salzmann, B. Ivanovic, P. Chakravarty and M. Pavone: "Trajectron++: Dynamically-Feasible Trajectory Forecasting with Heterogeneous Data"; In: Computer Vision—ECCV 2020, Cham, 2020, pages 683 to 700, M. Liang et al.: "Learning Lane Graph Representations for Motion Forecasting"; In: Computer Vision-ECCV 2020, Cham, 2020, pages 541 to 556, S. Khandelwal, W. Qi, J. Singh, A. Hartnett and D. Ramanan: "What-If Motion Prediction for Autonomous Driving" 2020 and/or Y. Ma, X. Zhu, S. Zhang, R. Yang, W. Wang and D. Manocha: "TrafficPredict: Trajectory Prediction for Heterogeneous Traffic-Agents"; In The Thirty-Third AAAI Conference on Artificial Intelligence, AAAI 2019, 2019, pages 6120 to 6127, doi: 10.1609/aaai.v33i01.33016120.

In a possible design of the method, the degrees of interaction between the vehicles is ascertained in pairs respectively for two vehicles.

In a further possible design of the method, dependencies between vehicles are learned in pairs in the machine training of the interaction algorithm and, to form degrees of interaction, the interaction algorithm is used to weight the extent to which the vehicles mutually influence each other in pairs. This makes it possible to simply and reliably ascertain the interactions between vehicles and determine the degrees of interaction in later operation of the interaction algorithm.

In a further possible design of the method, a trajectory prediction is generated in the machine training of the interaction algorithm, the trajectory prediction being used to train the interaction algorithm. This enables an effective training of the interaction algorithm and a particular high degree of exactness and reliability of the interaction algorithm when ascertaining the degrees of interaction.

In a further possible design of the method, the generated trajectory prediction is used in the machine training of the interaction algorithm for the implicit learning of the degrees of interaction.

In a further possible design of the method, all vehicles in a scene with a long short-term memory are encoded during an operation of the machine-trained interaction algorithm, wherein, during the encoding, nodes of a complete graph, also referred to as a fully connected graph, are formed. The use of the long short-term memory here enables recollection of earlier experiences and thus a short-term memory that lasts a long time, since a behavior in principle of the graph is encoded in corresponding weights. Here, relationships between the vehicles can be completely mapped by means of the complete graph.

In a further possible design of the method, the nodes are connected to one another via edges, wherein a spacing between the vehicles is used as an edge feature. Thus, a spacing between the vehicles can also be taken in consideration when ascertaining the respective degree of interaction.

In a further possible design of the method, map data of a high-resolution digital road map is used by means of the trajectory prediction algorithm for the trajectory prediction. The use of such a high-resolution digital road map makes it possible to save a location and a past movement of recorded and localized vehicles in the scene. Here, the road map can include road topology, road signs, traffic signals (for example signals of a traffic light system), pedestrian crossings, and further information and thus enables a particularly exact and reliable trajectory prediction.

In the method according to the invention for automatically operating an ego vehicle, in a method for trajectory prediction of vehicles in the surroundings of an ego vehicle according to the previous description, trajectories of vehicles in the surroundings of an ego vehicle are predicted, and the predicted trajectories are taken into consideration in the automatic operation of the vehicle during an automatic transverse and/or longitudinal control of the ego vehicle. By using the method for trajectory prediction of vehicles, a particularly reliable and safe automatic, for example highly automatic or autonomous, operation of the ego vehicle can be implemented.

Exemplary embodiments of the invention are explained in more detail below by means of drawings.

BRIEF DESCRIPTION OF THE DRAWING FIGURES

Figure 2:
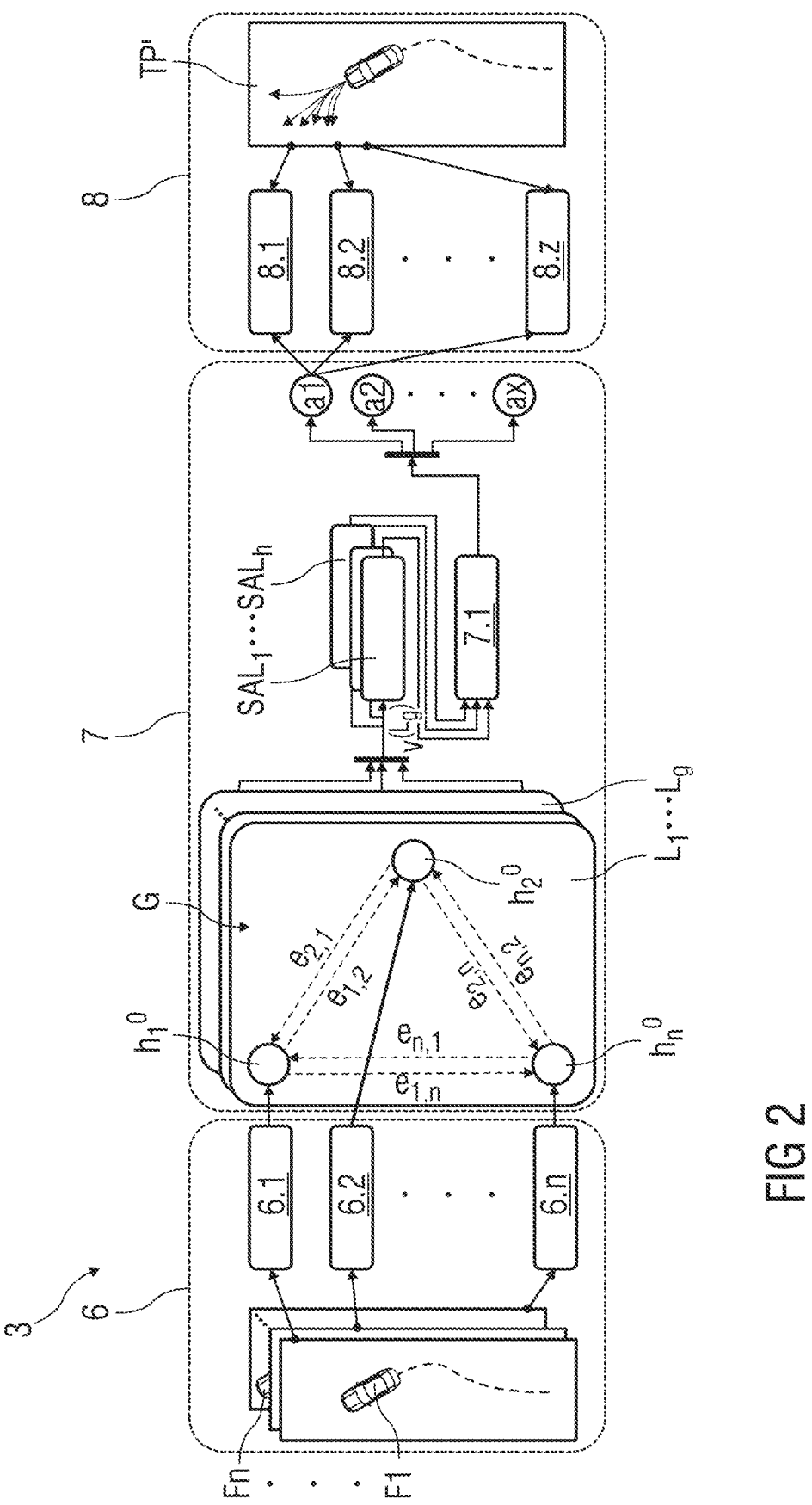
Figure 3:
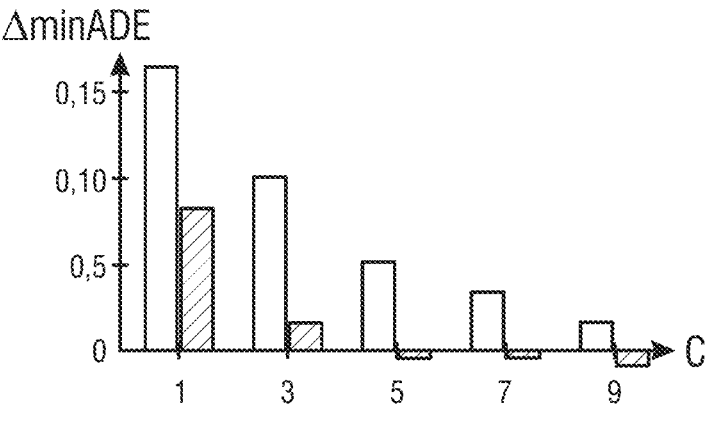
Figure 4:
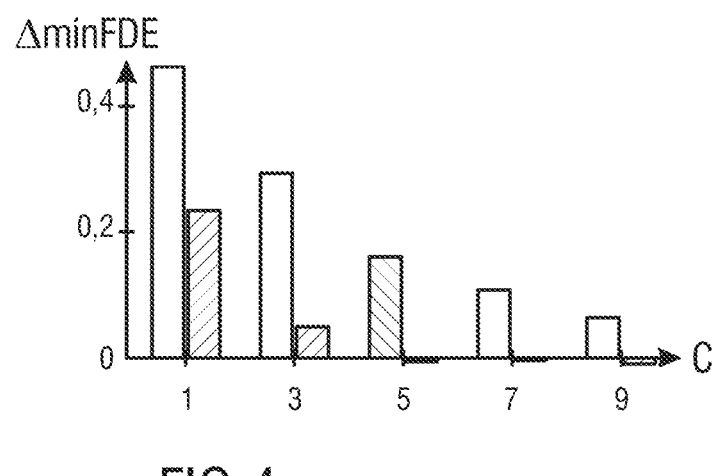
Figure 5:
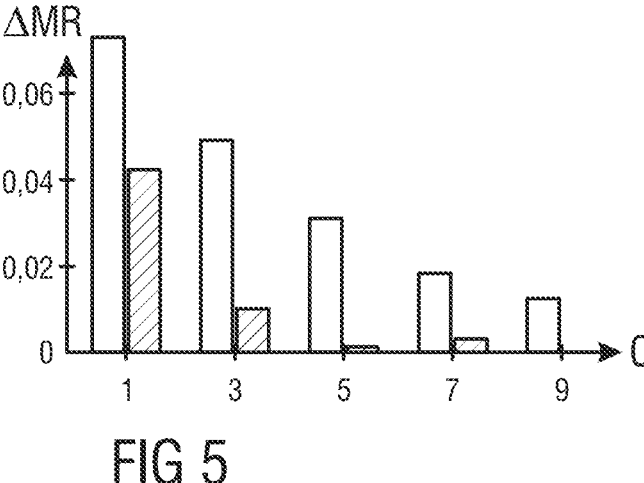

Here are shown:

FIG. 1 schematically, a block wiring diagram of a device for trajectory prediction, FIG. 2 schematically, a block wiring diagram of a device for forming an interaction algorithm, FIG. 3 schematically, a deviation of an average removal error for two trajectory predictions from one result of a final trajectory prediction algorithm for different numbers of vehicles in a scene, FIG. 4 schematically, a deviation of a final removal error for two trajectory predictions from one result of a final trajectory prediction algorithm for different numbers of vehicles in a scene, and FIG. 5 schematically, a deviation of an error classification rate for two trajectory predictions from one result of a final trajectory prediction algorithm for different numbers of vehicles in a scene.

Parts corresponding to one another are provided with the same reference numeral in all figures.

DETAILED DESCRIPTION

In FIG. 1, a block wiring diagram of a possible exemplary embodiment of a device 1 for trajectory prediction of vehicles F1 to Fn in the surroundings of an ego vehicle is depicted.

Data is stored in a data store 2, the data describing a scene in the surroundings of the ego vehicle. This data comprises surroundings data recorded by means of a surroundings recording sensor system, not depicted in more detail, of the ego vehicle, other vehicles and/or a vehicle infrastructure system and map data KD of a high resolution digital road map. The surroundings data here also comprises, in particular, data about the vehicles F1 to Fn.

In order to minimize a processing effort in the trajectory prediction of vehicles F1 to Fn in the surroundings of the ego vehicle, it is provided that interactions between the vehicle F1 to Fn, the trajectory of which is to be determined, and all other vehicles F1 to Fn in the scene, thus also the ego vehicle, are initially determined.

This determination is carried out by means of an attention-based interaction algorithm 3 that is trained by machine and ascertains degrees of interaction I1 to Im between the vehicles F1 to Fn, in particular between a vehicle F1 to Fn, the trajectory T of which is to be predicted, and the vehicles F1 to Fn in its surroundings. The determination of the degrees of interaction I1 to Im between the vehicles F1 to Fn is here carried out in pairs in each case for two vehicles F1 to Fn.

This interaction algorithm 3 is characterized by a low degree of complexity with short runtime and is focused only on interactions between the vehicles F1 to Fn. Map data KD of a high-resolution digital road map is not required for the determination of the degrees of interaction I1 to Im. The degrees of interaction I1 to Im here constitute so-called attention weights, which are formed by means of a so-called self-attention 3.1 of the attention-based interaction algorithm 3.

In particular, when ascertaining the degrees of interaction I1 to Im, trajectory predictions TP' are also generated, which are used for training the interaction algorithm 3. Here, the trajectory predictions TP' are used in the machine training of the interaction algorithm 3, for example for the implied learning of the degrees of interaction I1 to Im.

The respective degree of interaction I1 to Im cannot, however, be explicitly learned from data, since it is not "labelable". Accordingly, the attention-based interaction algorithm 3 is used, which implicitly learns the degrees of interaction I1 to Im between the vehicles F1 to Fn. In contrast, the training goal, i.e., the trajectory T to be predicted, is "labelable". The interactions between the vehicles F1 to Fn are nevertheless implicitly learned.

Here, the interaction algorithm 3 learns to use dependencies between individual vehicles F1 to Fn, in particular in pairs, in order to ascertain the degrees of interaction I1 to Im. This means learning of dependencies, in pairs, between the vehicles F1 to Fn is carried out. Here, an attention mechanism used respectively "weights" in pairs how greatly vehicles F1 to Fn mutually influence one another. The attention weights used here have values in the region of from 0.0 to 1.0, for example. Thus, it is possible to learn from a basic population of a dataset how important vehicles F1 to Fn respectively surrounding in a sequence or scene are for the prediction of a trajectory T of a selected vehicle F1 to Fn and/or ego vehicle.

After completing the training of the interaction algorithm 3, this is used in a so-called forward pass, in particular, wherein a trajectory then predicted by means of the interaction algorithm 3 plays a subordinate role. Instead, the attention weights of the vehicle F1 to Fn to be predicted that form the degrees of interaction I1 to Im are now picked up. These specify for each further vehicle F1 to Fn in the sequence how important this is for the prediction of the selected vehicle F1 to Fn and/or the ego vehicle.

Based on the respectively ascertained degree of interaction I1 to Im, a vehicle preselection A (F1 to Fn) is made by means of a selection unit 4. This means that individual vehicles F1 to Fn from the multitude of the vehicles F1 to Fn located in the surroundings of the ego vehicle are identified as relevant for the trajectory prediction and selected for this when their respective degree of interaction I1 to Im with the other vehicles F1 to Fn exceeds a predetermined threshold value. Here, an individual selection of relevant vehicles F1 to Fn is made for each vehicle F1 to Fn whose trajectory T is to be predicted. This is possible because the degrees of interaction I1 to Im are formed in pairs. For example, only a certain number of vehicles F1 to Fn is selected which have the highest attention weights, or all vehicles F1 to Fn are selected which have an attention weight of more than 0.3.

Only when the vehicle preselection A (F1 to Fn) has been made is an arbitrarily complex trajectory prediction algorithm 5 used. This also uses map data KD of a high-resolution digital road map and finally predicts a trajectory T for at least one of the vehicles F1 to Fn in the surroundings of the ego vehicle by means of the preselected vehicles F1 to Fn and the map data KD.

Both a training of the trajectory prediction algorithm 5 and an operation thereof in an ego vehicle that can be operated automatically by means of these finally predicted trajectories T is only carried out on based on the reduced vehicle preselection A (F1 to Fn) of interacting vehicles F1 to Fn. The vehicle preselection A (F1 to Fn) enables the final trajectory prediction algorithm 5 to be focused only on relevant or interacting vehicles F1 to Fn and simplifies the data-driven learning process, in particular as a result of better convergence. If the final trajectory prediction algorithm 5 additionally uses map data KD from the digital road map, this process is also simplified. The reason for this is that so-called "queries" from the road map, for example a distance apart from the next stopping point or a reliable maximum speed, can be very laborious in terms of time, and a preselection of the relevant vehicles F1 to Fn can greatly reduce the number of "queries".

FIG. 2 shows a block wiring diagram of a possible exemplary embodiment of a device for forming an interaction algorithm 3 according to FIG. 1. The interaction algorithm 3 is here formed as an implemented, attention-based trajectory prediction algorithm. In a manner not depicted in more detail, other designs of the interaction algorithm 3 are also possible as long as these ascertain the interaction degree I1 to Im in an attention-based manner.

All vehicles F1 to Fn are encoded in an input encoder 6 by means of so-called LSTM encoders 6.1 to 6.$n$ with a long short-term memory, wherein, when coding, nodes $h_1^0$ to $h_n^0$ of a complete graph G are formed. This means that the emerging encodings form nodes $h_1^0$ to $h_n^0$ in a so-called fully connected graph G. The nodes $h_1^0$ to $h_n^0$ are here connected to one another via edges $e_{1.2}$, $e_{1.n}$, $e_{2.1}$, $e_{2.n}$, $e_{n.1}$, $e_{n.2}$. A spacing between the vehicles F1 to Fn is used as an additional edge feature, i.e., for forming the edges $e_{1.2}$, $e_{1.n}$, $e_{2.1}$, $e_{2.n}$, $e_{n.1}$, $e_{n.2}$.

The graph G is formed here in an interaction module 7, which forms a core of the interaction algorithm 3, in several layers $L_1$ to $L_g$. Furthermore, the interaction module comprises so-called parallel self-attention heads $SAL_1$ to $SAL_h$ required for the method. Using these, a so-called multi-head self-attention according to Ashish Vaswani et. al: "Attention Is All You Need" is carried out.

Vectors $v^{(Lg)}$ ascertained by means of the layers $L_1$ to $L_g$ are supplied to the self-attention heads $SAL_1$ to $SAL_h$, wherein a joining and linearization of events emitted by means of the self-attention heads $SAL_1$ to $SAL_h$ is carried out by means of a joining unit 7.1, and thus features a1 to an formed as latent encodings that have been updated based on the degrees of interaction I1 to Im and used for training are determined. The features a1 to an are then decoded to form a trajectory T in order to enable the implicit learning of the degrees of interaction I1 to Im. This means dependencies and/or weightings between the vehicles F1 to Fn in a scene and thus degrees of interaction I1 to Im between agents, i.e., the vehicles F1 to Fn, are learned in pairs in the interaction module 7. The respective degree of interaction I1 to Im is formed, for example, according to Ashish Vaswani et. al: "Attention Is All You Need" as paired weighting as a result of a so-called softmax function. The degrees of interaction I1 to Im are subsequently further used in order to form the features a1 to an. In particular, the degrees of interaction I1 to Im are saved in a matrix M with the shape n×n.

By means of an output decoder 8, the trajectory prediction TP' for the vehicles F1 to Fn is generated from the degrees of interaction I1 to Im by means of so-called linear residual decoders 8.1 to 8.z, the trajectory prediction, however, only being used for training the interaction algorithm 3. When used in the trajectory prediction algorithm 5, this trajectory prediction TP' is not used, but instead only the vehicle preselection A (F1 to Fn) is made by the attention weightings, i.e., the degrees of interaction I1 to Im. Here, residual layers are to be understood as layers that consist of several neurone layers. In contrast to conventional multi-layer perceptrons (MLP for short), with residual layers, a so-called "skip connection" is introduced. This makes it possible for an encoding of a first layer to be to the encoding of a final layer by means of a linear operation. During the training, a linear backpropagation of an error is thus made possible. This shows good results, particularly with deep neuronal networks.

In FIGS. 3 to 5, three established metrics are depicted that are used for determining a quality of trajectory predictions.

Here, the metrics comprise a change ΔminADE, depicted in FIG. 3, of a minimum average displacement error depending on a fixed number C of vehicles F1 to Fn per scene for trajectory predictions ascertained by means of the trajectory prediction algorithm 5 described in FIGS. 1 and 2 based on the vehicle preselection A (F1 to Fn) (hatched bars) and for a trajectory prediction algorithm for which the number C of vehicles F1 to Fn has been limited by means of a distance-based method (unhatched bars). The minimum average displacement error here specifies how far removed each calculated position of the respective trajectory T is from its true position in the means.

The metrics furthermore comprise a change ΔminFDE, depicted in FIG. 4, of a minimum final displacement error depending on the fixed number C of vehicles F1 to Fn per scene for trajectory predictions ascertained by means of the trajectory prediction algorithm 5 described in FIGS. 1 and 2 based on the vehicle preselection A (F1 to Fn) (hatched bars) and for the trajectory prediction algorithm for which the number C of vehicles F1 to Fn has been limited by means of a distance-based method (unhatched bars). The minimum final displacement error here specifies a deviation of a prediction from a true trajectory T for the respective final prediction step.

The metrics furthermore comprise a change ΔMR, depicted in FIG. 5, of an error classification rate depending on the fixed number C of vehicles F1 to Fn per scene for trajectory predictions ascertained by means of the trajectory prediction algorithm 5 described in FIGS. 1 and 2 based on the vehicle preselection A (F1 to Fn) (hatched bars) and for the trajectory prediction algorithm for which the number C of vehicles F1 to Fn has been limited by means of a distance-based method (unhatched bars).

For all metrics, lower values are better.

For a known and established final trajectory prediction algorithm 5, these metrics are used to compare how the described interaction-based vehicle preselection A (F1 to Fn) performs in comparison to distance-based (Euclidean) selection.

A respective 0-value is given by a result of the final trajectory prediction algorithm 5, which is trained and tested on the same dataset. Only the deviation from this basis is specified. The number C here refers to a fixed number to which the vehicles F1 to Fn in each scene are reduced.

The metrics clearly show that, using the described interaction-based preselection A (F1 to Fn) for each value of the number C, better results are accomplished by means of the trajectory prediction algorithm 5 than when using the distance-based selection. This means a quality improvement of the final trajectory prediction is achieved in comparison to approaches with distance-based preselection.

With the change ΔminADE of the minimum average displacement error and the change ΔminFDE of the minimum final displacement error, due to the reduced complexity with a number C of five, seven and nine vehicles F1 to Fn, there is even an improvement in performance in comparison to a final trajectory prediction algorithm 5, which is trained on the entire data set, which can be seen from the negative values. This means that a quality improvement of the final trajectory prediction can be achieved compared to approaches without preselection.

Furthermore, by using the interaction-based preselection A (F1 to Fn), a runtime of the final trajectory prediction algorithm 5 can be achieved in comparison to a trajectory prediction algorithm 5 based on the entire scene with all vehicles F1 to Fn.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method for trajectory prediction of a plurality of vehicles in surroundings of an ego vehicle, the method comprising:

determining, using an attention-based interaction algorithm trained by machine of the ego vehicle, degrees of interaction between the plurality of vehicles;

identifying and selecting, by the ego vehicle using the attention-based interaction algorithm, individual vehicles from the plurality of the vehicles as relevant to the trajectory prediction, wherein the individual vehicles are identified and selected as relevant when the individual vehicles have a respective degree of interaction with other vehicles of the plurality of vehicles exceeding a predetermined threshold value;

training, by the ego vehicle in a subsequent learning step, a trajectory prediction algorithm with the individual vehicles selected as relevant to the trajectory prediction; and performing, by the ego vehicle using the trajectory prediction algorithm, the trajectory prediction for the individual vehicles selected as relevant to the trajectory prediction.

2. The method of claim 1, wherein degrees of interaction between the plurality of vehicles are determined in pairs of vehicles of the plurality of vehicles.

3. The method of claim 1, wherein dependencies between vehicles are learned in pairs in the machine training of the attention-based interaction algorithm and, to form degrees of interaction by the attention-based interaction algorithm, the dependencies are weighted in pairs as to how great a mutual influence of the vehicles is.

4. The method of claim 1, wherein a trajectory prediction, which is used to train the attention-based interaction algorithm, is generated in the machine training of the attention-based interaction algorithm.

5. The method of claim 4, wherein the generated trajectory prediction is used in the machine training of the attention-based interaction algorithm for the implicit learning of degrees of interaction of the plurality of vehicles.

6. The method of claim 1, wherein, during an operation of the machine trained attention-based interaction algorithm, all vehicles of the plurality of vehicle in a scene are encoded with a long short-term memory, wherein, when encoding, nodes of a complete graph are formed.

7. The method of claim 6, wherein the nodes are connected to one another via edges, wherein a spacing apart between respective ones of the plurality of vehicles is used as an edge feature.

8. The method of claim 1, wherein map data of a high-resolution digital road map is used by the trajectory prediction algorithm for the trajectory prediction.

9. A method for automatically operating an ego vehicle, wherein a plurality of vehicles is in surroundings of the ego vehicle, the method comprising:

determining, using an attention-based interaction algorithm trained by machine, degrees of interaction between the plurality of vehicles;

identifying and selecting, using the attention-based interaction algorithm, individual vehicles from the plurality of the vehicles as relevant to the trajectory prediction, wherein the individual vehicles are identified and selected as relevant when the individual vehicles have a respective degree of interaction with other vehicles of the plurality of vehicles exceeding a predetermined threshold value;

training, in a subsequent learning step, a trajectory prediction algorithm with the individual vehicles selected as relevant to the trajectory prediction;

preforming, the trajectory prediction algorithm, the trajectory prediction for the individual vehicles selected as relevant to the trajectory prediction; and automatically controlling transverse or longitudinal movement of the ego vehicle based on the predicted trajectories.

10. The method of claim 9, wherein degrees of interaction between the plurality of vehicles are determined in pairs of vehicles of the plurality of vehicles.

11. The method of claim 9, wherein dependencies between vehicles are learned in pairs in the machine training of the attention-based interaction algorithm and, to form degrees of interaction by the attention-based interaction algorithm, the dependencies are weighted in pairs as to how great a mutual influence of the vehicles is.

12. The method of claim 9, wherein a trajectory prediction, which is used to train the attention-based interaction algorithm, is generated in the machine training of the attention-based interaction algorithm.

13. The method of claim 12, wherein the generated trajectory prediction is used in the machine training of the attention-based interaction algorithm for the implicit learning of degrees of interaction of the plurality of vehicles.

14. The method of claim 9, wherein, during an operation of the machine trained attention-based interaction algorithm, all vehicles of the plurality of vehicle in a scene are encoded with a long short-term memory, wherein, when encoding, nodes of a complete graph are formed.

15. The method of claim 14, wherein the nodes are connected to one another via edges, wherein a spacing apart between respective ones of the plurality of vehicles is used as an edge feature.

16. The method of claim 9, wherein map data of a high-resolution digital road map is used by the trajectory prediction algorithm for the trajectory prediction.

* * * * *